(12) United States Patent
Amitai (10) Patent No.: US 7,751,122 B2
(45) Date of Patent: Jul. 6, 2010

(54) SUBSTRATE-GUIDED OPTICAL DEVICE PARTICULARLY FOR VISION ENHANCED OPTICAL SYSTEMS

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 361 days.

(21) Appl. No.: 11/815,549

(22) PCT Filed: Feb. 8, 2006

(86) PCT No.: PCT/IL2006/000158

§ 371 (c)(1),
(2), (4) Date: Aug. 3, 2007

(87) PCT Pub. No.: WO2006/085310

PCT Pub. Date: Aug. 17, 2006

(65) Prior Publication Data

US 2008/0186604 A1    Aug. 7, 2008

(30) Foreign Application Priority Data

Feb. 10, 2005 (IL) ..................................... 166799
Jan. 31, 2006 (IL) ..................................... 173452

(51) Int. Cl.
*G02B 27/14* (2006.01)
*G02B 6/10* (2006.01)

(52) U.S. Cl. ..................... 359/630; 359/633; 385/132
(58) Field of Classification Search ................. 359/630, 359/633; 385/129, 132, 133
See application file for complete search history.

(56) References Cited

U.S. PATENT DOCUMENTS 5,076,664 A    12/1991    Migozzi
6,349,001 B1    2/2002    Spitzer

FOREIGN PATENT DOCUMENTS

| EP | 0 399 865 A1 | 11/1990 |
|----|--------------|---------|
| EP | 0 566 004 A2 | 10/1993 |
| EP | 1 385 023 A1 | 1/2004 |
| WO | WO 01/95027 A2 | 12/2001 |
| WO | WO 03/081320 A1 | 10/2003 |
| WO | WO 2004/109349 A2 | 12/2004 |

*Primary Examiner*—Jack Dinh (57) ABSTRACT

There is provided an optical system, including a mechanical body (110), a light-transmitting substrate (20) having two major surfaces and edges, embedded in the mechanical body, an optical element (90) for coupling light into the substrate by total internal reflection and a plurality of partially reflecting surfaces (22) carried by the substrate, wherein the partially reflecting surfaces are parallel to each other and are not parallel to any of the edges of the substrate. The system also includes an image capturing device (112), a display source (4), and an image-processing unit (114). The image-capturing device (112) is connected via the image-processing unit (114) to the display source (4).

24 Claims, 8 Drawing Sheets

SUBSTRATE-GUIDED OPTICAL DEVICE PARTICULARLY FOR VISION ENHANCED OPTICAL SYSTEMS

FIELD OF THE INVENTION

The present invention relates to substrate-guided optical systems, and in particular, to devices which include a plurality of partially reflecting surfaces carried by a common light-transmissive substrate, also referred to as a light wave-guide optical element (LOE).

The invention can be implemented to advantage in a large number of imaging applications, such as head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the important applications for compact optical elements is in head-mounted displays wherein an optical module serves both as an imaging lens and a combiner, in that a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. Unfortunately, as the desired field-of-view (FOV) of the system increases, such a conventional optical module becomes larger, heavier, bulkier and therefore, even for a moderate performance device, impractical. This is a major drawback for all kinds of displays but especially in head-mounted applications, wherein the system must necessarily be as light and as compact as possible.

The strive for compactness has led to several different complex optical solutions, all of which, on one hand, are still not sufficiently compact for most practical applications, and, on the other hand, suffer major drawbacks in terms of manufacturability. Furthermore, the eye-motion-box of the optical viewing angles resulting from these designs is usually very small—typically less than 8 mm. Hence, the performance of the optical system is very sensitive, even to small movements of the optical system relative to the eye of the viewer, and does not allow sufficient pupil motion for comfortable reading of text from such displays.

DISCLOSURE OF THE INVENTION

The present invention facilitates the design and fabrication of very compact LOE for, amongst other applications, head-mounted displays. The invention allows relatively wide FOVs together with relatively large eye-motion-box values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modem combat aircraft, but also in civilian aircraft, in which HUD systems have become a key component for low-visibility landing operation. Furthermore, there have recently been numerous proposals and designs for HUDs in automotive applications where they can potentially assist the driver in driving and navigation tasks. Nevertheless, state-of-the-art HUDs suffer several significant drawbacks. All HUDs of the current designs require a display source that must be offset a significant distance from the combiner to ensure that the source illuminates the entire combiner surface. As a result, the combiner-projector HUD system is necessarily bulky, large and requires considerable installation space, which makes it inconvenient for installation and at times even unsafe to use. The large optical aperture of conventional HUDs also poses a significant optical design challenge, either rendering the HUDs with compromising performance, or leading to high cost wherever high-performance is required. The chromatic dispersion of high-quality holographic HUDs is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can be readily installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. Thereby, the present invention enables the viewing of the digital content of a full format internet page within a small, hand-held device, such as a cellular phone.

A broad object of the present invention is therefore to alleviate the drawbacks of state-of-the-art compact optical display devices and to provide other optical components and systems having improved performance, according to specific requirements.

In accordance with the invention there is therefore provided an optical system, comprising a mechanical body, a light-transmitting substrate having at least two major surfaces and edges, embedded in said mechanical body, optical means for coupling light into said substrate by total internal reflection, a plurality of partially reflecting surfaces carried by said substrate wherein said partially reflecting surfaces are parallel to each other and are not parallel to any of the edges of said substrate, at least one image capturing device, at least one display source, and an image processing unit, characterized in that the image capturing device is connected via the image processing unit to the display source.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings.

DETAILED DESCRIPTION OF PREFERRED EMBODIMENTS

Figure 1:
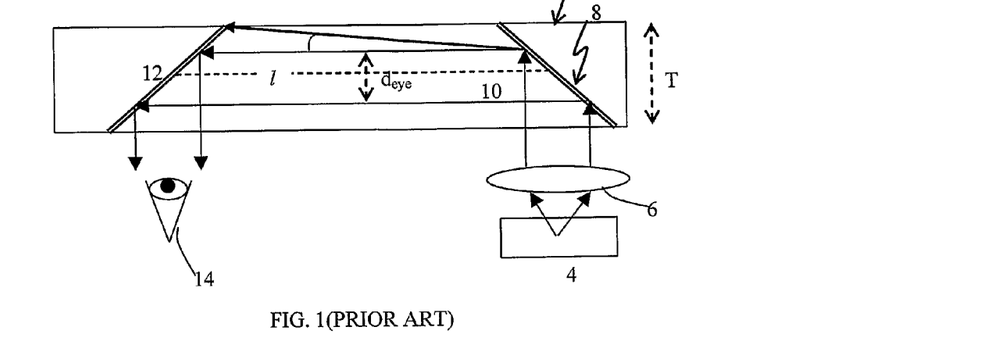
FIG. 1 is a side view of a generic form of a prior art folding optical system.

FIG. 1 illustrates a prior folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye 14 of a viewer. Despite the compactness of this configuration, it suffers significant drawbacks; in particular only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein T is the substrate thickness;
$d_{eye}$ is the desired exit-pupil diameter, and
l is the distance between reflecting surfaces 8 and 12.

With angles higher than $\alpha_{max}$ the rays are reflected from the substrate surface before arriving at the reflecting surface 12. Hence, the reflecting surface 12 will be illuminated at an undesired direction and ghost images will appear.

Therefore, the maximum achievable FOV with this configuration is:

$$FOV_{max} \approx 2\nu\alpha_{max}, \quad (2)$$

wherein $\nu$ is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8-10 mm, and the distance between the optical axis of the eye and the side of the head, l, typically to be between 40 and 80 mm, even for a small FOV of 8°, the desired substrate thickness would be of the order of 12 mm.

Methods have been proposed to overcome the above problem. These include utilizing a magnifying telescope inside the substrate and non-parallel coupling directions. Even with these solutions however, and even if only one reflecting surface is considered, the system thickness remains limited by a similar value. The FOV is limited by the diameter of the projection of the reflective surface 12 on the substrate plane. Mathematically, the maximum achievable FOV due to this limitation, is expressed as:

$$FOV_{max} \approx \frac{T\tan\alpha_{sur} - d_{eye}}{R_{eye}}, \quad (3)$$

wherein, $\alpha_{sur}$, is the angle between the reflecting surface and the normal to the substrate plane, and $R_{eye}$, is the distance between the eye of the viewer and the substrate (typically, about 30-40 mm).

In practice, $\tan\alpha_{sur}$ cannot be much larger than 1; hence, for the same parameters described above for a FOV of 8°, the required substrate thickness here is of the order of 7 mm, which is an improvement on the previous limit. Nevertheless, as the desired FOV is increased, the substrate thickness increases rapidly. For instance, for desired FOVs of 15° and 30°, the substrate limiting thickness is 18 mm and 25 mm, respectively.

Figure 2:
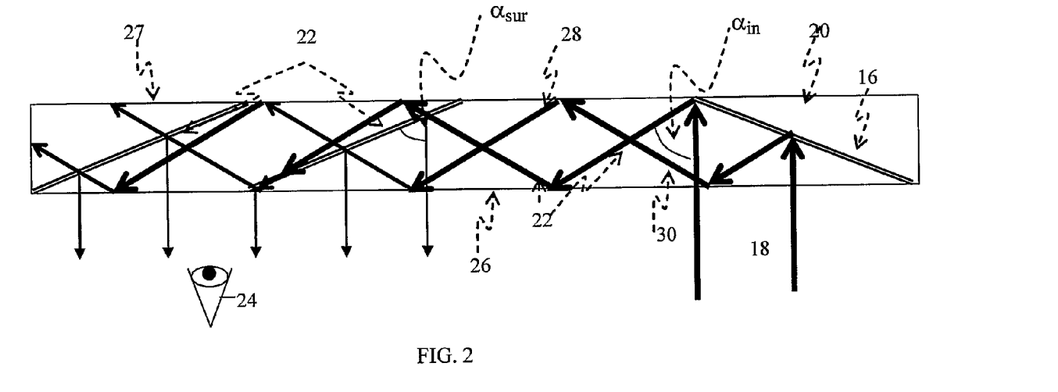
FIG. 2 is a side view of an exemplary LOE.

To alleviate the above limitations, the present invention utilizes an array of selectively reflecting surfaces fabricated within an LOE. FIG. 2 illustrates a sectional view of an LOE according to the present invention. The first reflecting surface 16 is illuminated by a collimated display 18 emanating from a light source (not shown) located behind the device. The reflecting surface 16 reflects the incident light from the source such that the light is trapped inside a planar substrate 20 by total internal reflection. After several reflections off the surfaces of the substrate, the trapped waves reach an array of selectively reflecting surfaces 22, which couple the light out of the substrate into the eye 24 of a viewer. Herein, the input surface of the LOE will be defined as the surface through which the input waves enter the LOE and the output surface of the LOE will be defined as the surface through which the trapped waves exit the LOE. In the case of the LOE illustrated in FIG. 2, both the input and the output surfaces coincide with the lower surface 26. Other configurations, however, are envisioned in which the input and the image waves could be located on opposite sides of the substrate. Assuming that the central wave of the source is coupled out of the substrate 20 in a direction normal to the substrate surface 26, the reflecting surfaces 22 are flat, and the off-axis angle of the coupled wave inside the substrate 20 is $\alpha_{in}$, then the angle $\alpha_{sur2}$ between the reflecting surfaces and the normal to the substrate plane is:

$$\alpha_{sur2} = \frac{\alpha_{in}}{2}. \qquad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26 and 27, wherein the incident angle $\beta_{ref}$ between the trapped ray and the normal to the reflecting surface is:

$$\beta_{ref} = 90° - (\alpha_{in} - \alpha_{sur2}) = 90° - \frac{\alpha_{in}}{2}. \qquad (5)$$

The trapped rays arrive at the reflecting surface from the second direction 30 after an odd number of reflections from the substrate surfaces 26 and 27, where the off-axis angle is $\alpha'_{in} = 180° - \alpha_{in}$ and the incident angle between the trapped ray and the normal to the reflecting surface is:

$$\begin{aligned}\beta'_{ref} &= 90° - (\alpha'_{in} - \alpha_{sur2}) \\ &= 90° - (180° - \alpha_{in} - \alpha_{sur2}) \\ &= -90° + \frac{3\alpha_{in}}{2}.\end{aligned} \qquad (6)$$

As illustrated in FIG. 2, for each reflecting surface, each ray first arrives at the surface from the direction 30, wherein some of the rays impinge on the surface again, from direction 28. In order to prevent undesired reflections and ghost images, it is important that the reflectance be negligible for the rays that impinge on the surface having the second direction 28.

Two solutions to this requirement were previously proposed. The first exploits the angular sensitivity of thin film coatings. The desired discrimination between the two incident directions can be achieved if one angle is significantly smaller than the other one. It is possible to provide a coating with very low reflectance at high incident angles and a high reflectance for low incident angles. This property can be exploited to prevent undesired reflections and ghost images by eliminating the reflectance in one of the two directions. For example choosing $\beta_{ref} \sim 25°$ from Equations (5) and (6) it can be calculated that:

$$\beta'_{ref} = 105°; \alpha_{in} = 50°; \alpha'_{in} = 130°; \alpha_{sur2} = 25°. \qquad (7)$$

Figure 3A:
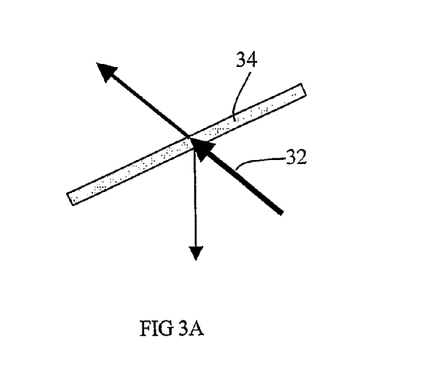
FIGS. 3A and 3B illustrate the desired reflectance and transmittance characteristics of selectively reflecting surfaces used in the present invention for two ranges of incident angles.
Figure 3B:
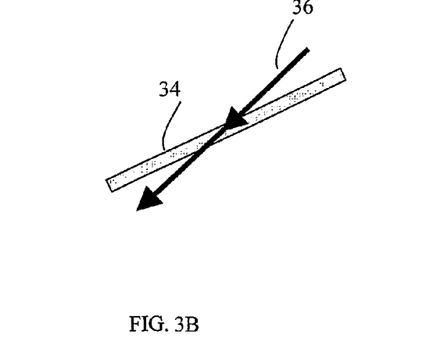

If a reflecting surface is now determined for which $\beta'_{ref}$ is not reflected but $\beta_{ref}$ is, then the desired condition is achieved. FIGS. 3A and 3B illustrate the desired reflectance behavior of selectively reflecting surfaces. While the ray 32 (FIG. 3A), having an off-axis angle of $\beta_{ref} \sim 25°$, is partially reflected and is coupled out of the substrate 34, the ray 36 (FIG. 3B), which arrives at an off-axis angle of $\beta'_{ref} \sim 75°$ to the reflecting surface (which is equivalent to $\beta'_{ref} \sim 105°$), is transmitted through the reflecting surface 34 without any notable reflection.

Figure 4:
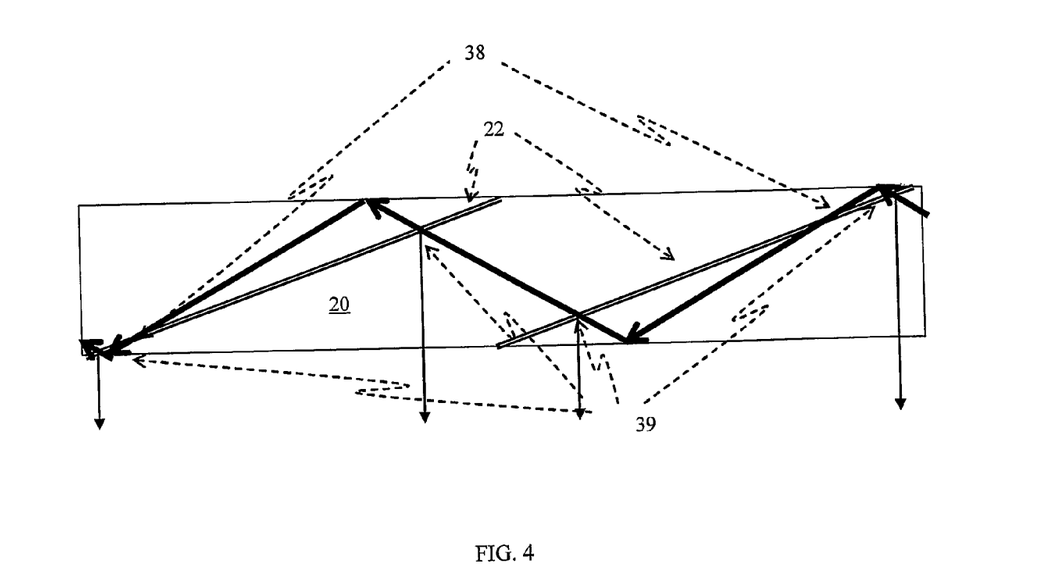
FIG. 4 is a diagram illustrating a detailed sectional view of an exemplary array of selectively reflective surfaces.

FIG. 4 is a detailed sectional view of an array of selectively reflective surfaces which couple light trapped inside the substrate out and into the eye of a viewer. As can be seen, in each cycle the coupled ray passes through reflecting surfaces 38, having a direction of $\alpha'_{in} = 130°$, whereby the angle between the ray and the normal to the reflecting surfaces is $\sim 75°$ and the reflections from these surfaces are negligible. In addition, in each cycle, the ray passes through the reflecting surface 39 twice in a direction of $\alpha_{in} = 50°$, where the incident angle is 25° and part of the energy of the ray is coupled out of the substrate.

An alternative solution utilizes anisotropic reflecting surfaces, that is, optical surfaces having a major axis parallel to the surface plane wherein the reflection and transmission properties of the surface depend strongly in the orientation of the polarization of the incident light in relation to the major axis of the surface. The desired discrimination between the two incident directions can be achieved by exploiting the fact that the undesired direction meets the surface after the ray has transferred the surface in the desired direction.

Figure 5:
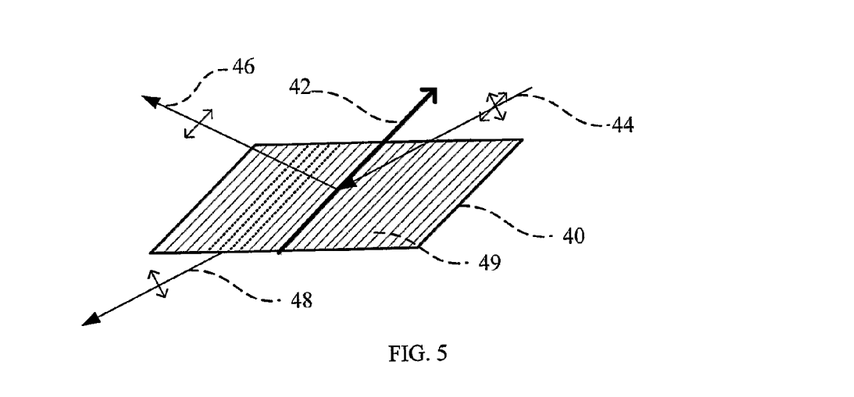
FIG. 5 illustrates the reflectance and the transmittance performance of an anisotropic reflecting surface which is oriented to reflect s-polarized light.

FIG. 5 Illustrates an example of an anisotropic partially reflecting surface 40 having a major axis 42. An unpolarized light wave 44 impinges on the surface. The partially reflecting surface reflects the component of the light 46 with its electrical field vector parallel to the major axis 42 and transmits the component of the light 48 with its electrical field vector perpendicular to the major axis 42.

Figure 6:
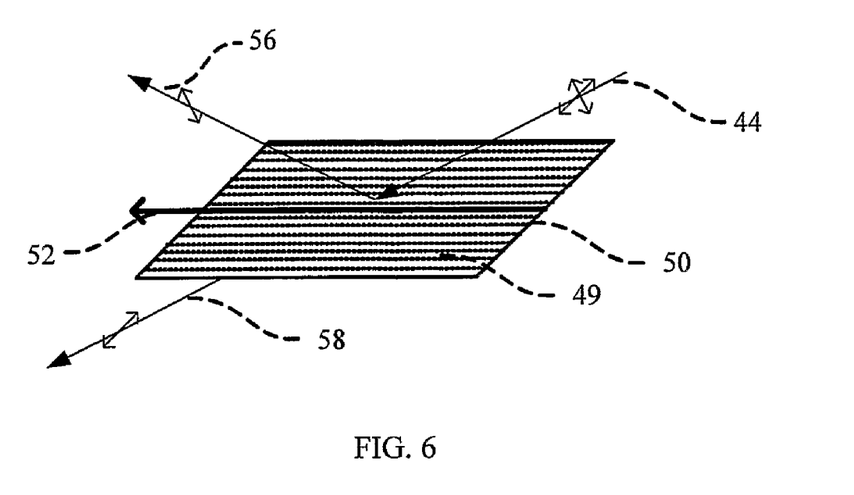
FIG. 6 illustrates the reflectance and the transmittance performance of an anisotropic reflecting surface which is oriented to reflect p-polarized light.

A possible candidate for the required anisotropic partially reflecting element can be a wire grid polarizing beamsplitter 50, generally in the form of an array of thin parallel conductors supported by a transparent substrate. The key factor that determines the performance of a wire grid polarizing beamsplitter 50 is the relationship between the center-to-center spacing, or period, of the parallel grid elements and the wavelength of the incident radiation. When the grid spacing or period is much shorter than the wavelength, the grid functions as a polarizing beamsplitter 50 that reflects electromagnetic radiation polarized parallel to the grid elements, and transmits radiation of the orthogonal polarization. In this case, the major axis of a wire grid polarizing beamsplitter 50 is defined as parallel to the array of conductors. Usually, in order to obtain the best transmission and contrast, the wire grid polarizing beamsplitter should be used to transmit the p-polarization and reflect the s-polarization, as illustrated in FIG. 5. However, it is possible to use the beamsplitter in the orthogonal orientation, illustrated in FIG. 6, also. That is, the main axis 52 of the polarizing beamsplitter 50 is oriented parallel to the propagation direction of the incident beam 44. Since now the major axis of the polarizing beamsplitter is parallel to the electric field of the p-polarized light, the polarizing beamsplitter reflects the component of the p-polarized light 56 with its electrical field vector parallel to the major axis 52 and transmits the component of the s-polarized light 58 with its electrical field vector perpendicular to the major axis 52. Usually, the geometry illustrated in FIG. 6 has reduced efficiency and contrast compared to the one described in FIG. 5. However, for some applications this geometry can also be useful.

Figure 7:
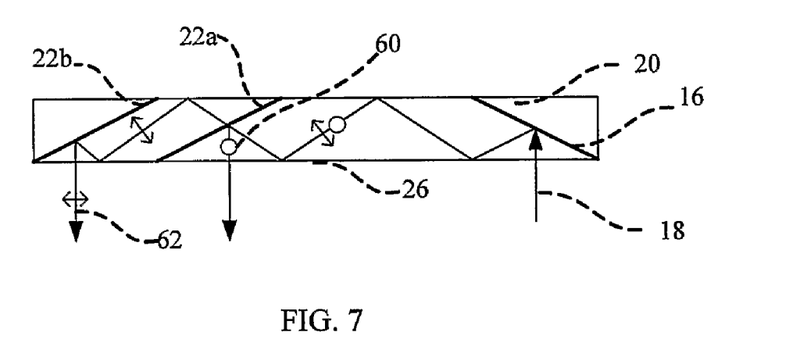
FIG. 7 illustrates another detailed sectional view of an exemplary array of selectively reflective surfaces.

FIG. 7 illustrates an example of an LOE, exploiting wire grid polarizing beamsplitters as partially reflecting surfaces according to the present invention. The first reflecting surface 16 is illuminated by an unpolarized collimated display 18 emanating from a light source (not shown) located behind the device. The reflecting surface 16 reflects the incident light from the source such that the light is trapped inside the planar substrate 20 by total internal reflection. After several reflections off the surfaces of the substrate, the trapped waves reach the first partially reflecting surface 22a, the major axis of which is oriented to reflect the s-polarized component 60 of the trapped wave 18. The p-polarized component 62 is transmitted and then reflected by the second reflecting surface 22b, the major axis of which is oriented to reflect p-polarized light waves. Both the s-polarized 60 and p-polarized 62 waves are coupled out of the substrate into the eye 24 of a viewer. Naturally, for this configuration the polarization components of the input beam should be balanced. Hence, care must be taken to prevent birefringent effects from the collimating lens as well as in the substrate 20 itself.

Figure 8:
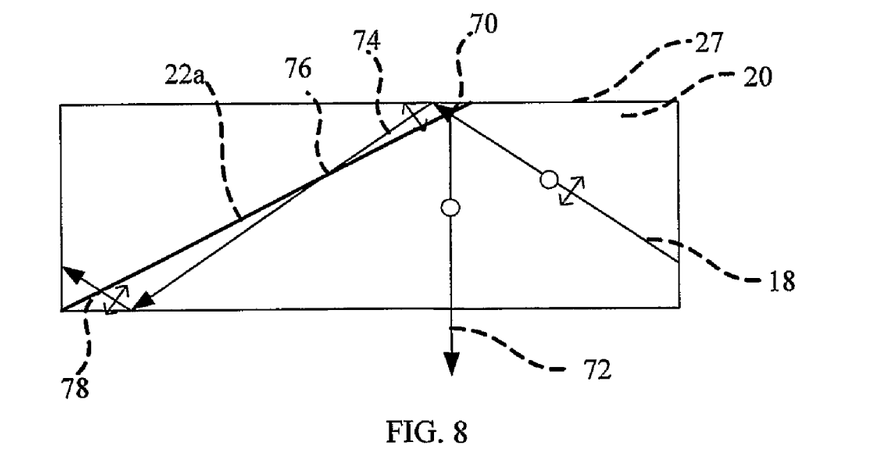
FIG. 8 is a schematic sectional-view of a reflective surface according to the present invention.

FIG. 8 is a detailed sectional view of the selectively reflective surface 22 which couples light, trapped inside the substrate, out and into the eye of a viewer. As can be seen, in each cycle the coupled ray 18 passes through reflecting surfaces 22 three times. At the first incident point 70, the s-polarized component 72 is reflected and coupled out of the substrate. The transmitted p-polarized component 74 is reflected off one of the outer surfaces 27 and then meets surface 22a again at the points 76 and 78, in between which it is again reflected off the opposite outer surface. At these two points, 76 and 78, however, the incident light is p-polarized, while the orientation of surface 22a is set to reflect s-polarized light and to transmit p-polarized light. Hence, the reflections at these points can be negligible, as required above, in relation to FIG. 2, in order to prevent undesired reflections and ghost images. Naturally, this concept can be valid not only for the example illustrated in FIGS. 7 and 8 but also in more general cases, wherein more than two partially reflecting surfaces are utilized to project the image into the eyes of a viewer.

In general, all the different configurations of the light-guide optical elements considered above, offer several important advantages over alternative compact optics for display applications, which include:

1) The input display source can be located very close to the substrate, so that the overall optical system is very compact and lightweight, offering an unparalleled form-factor;
2) In contrast to other compact display configurations, the present invention offers flexibility as to location of the input display source relative to the eyepiece. This flexibility, combined with the ability to locate the source close to the expanding substrate, alleviates the need to use an off-axis optical configuration that is common to other display systems. In addition, since the input aperture of the LOE is much smaller than the active area of the output aperture, the numerical aperture of the collimating lens 6 is much smaller than required for a comparable conventional imaging system. Consequently a significantly more convenient optical system can be implemented and the many difficulties associated with off-axis optics and high numerical-aperture lenses, such as field or chromatic aberrations can be compensated for relatively easily and efficiently;
3) The reflectance coefficients of the selectively reflective surfaces in the present invention are essentially identical over the entire relevant spectrum. Hence, both monochromatic and polychromatic light sources may be used as display sources. The LOE has a negligible wavelength-dependence, ensuring high-quality color displays with high resolutions;
4) Since each point from the input display is transformed into a plane light wave that is reflected into the eye of the viewer from a large part of the reflecting array, the tolerances on the exact location of the eye can be significantly relaxed. As such, the viewer can see the entire FOV, and the eye-motion-box can be significantly larger than in other compact display configurations, and
5) Since a large part of the intensity from the display source is coupled into the substrate, and since a large portion of this coupled energy is "recycled" and coupled out into the eye of the viewer, a display of comparatively high brightness can be achieved even with display sources with low power consumption.

Figure 9:
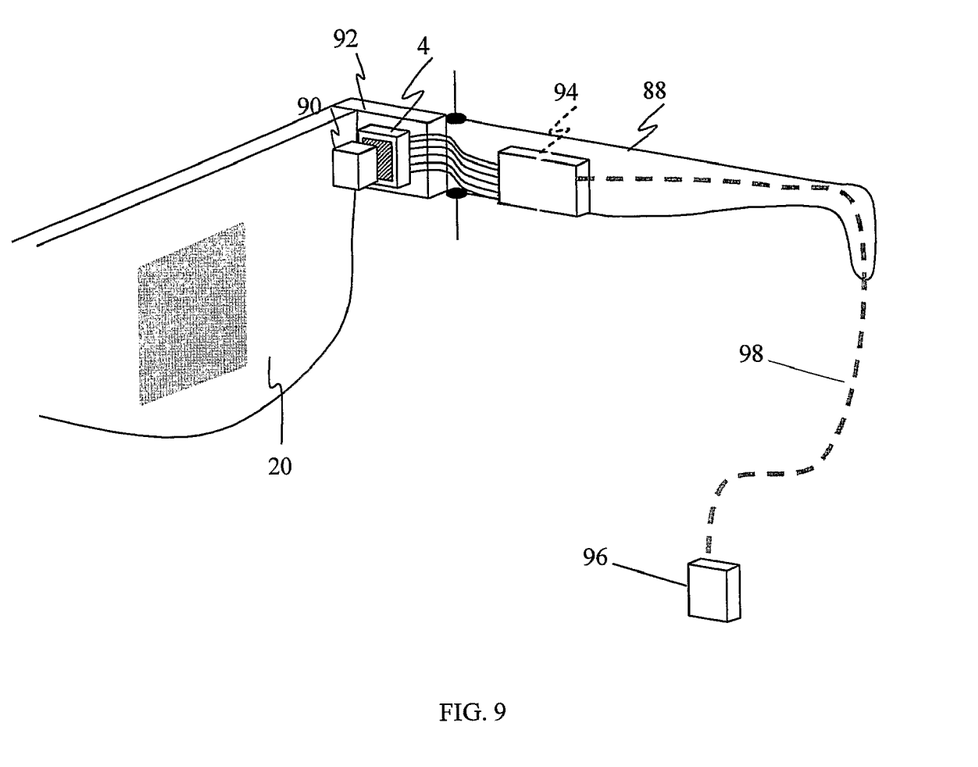
FIG. 9 illustrates an exemplary embodiment of an LOE embedded in standard eyeglass frames.

FIG. 9 illustrates an embodiment of the present invention, in which the LOE 20 is embedded in eyeglass frames 88. The display source 4, the collimating lens, and the folding element 90 are assembled inside the arm portions 92 of the eyeglass frames, next to the edge of the LOE 20. For a case in which the display source is an electronic element, such as a small CRT, LCD or OLED, the driving electronics 94 for the display source might be assembled inside the back portion of the arm 92. A power supply and data interface 96 can be connected to arm 92 by a lead 98 or any other communication means, including radio or optical transmission. Alternatively, a battery and miniature data link electronics can be integrated into the eyeglass frames.

The embodiment described above can serve in both see-through and non-see-through systems. In the latter case, opaque layers are located in front of the LOE 20. It is not necessary to occlude the entire LOE, just the active area, where the display is visible. This way, the device maintains peripheral vision for the user, replicating the viewing experience of a computer or a television screen, in which such peripheral vision serves an important cognitive function. Alternatively, a variable filter can be placed in front of the system in such a way that the viewer can control the level of brightness of the light emerging from the external scene. This variable filter could either be a mechanically controlled device, such as a folding filter or two rotating polarizers, an electronically controlled device, or even an automatic device whereby the transmittance of the filter is determined by the brightness of the external background.

Figure 10:
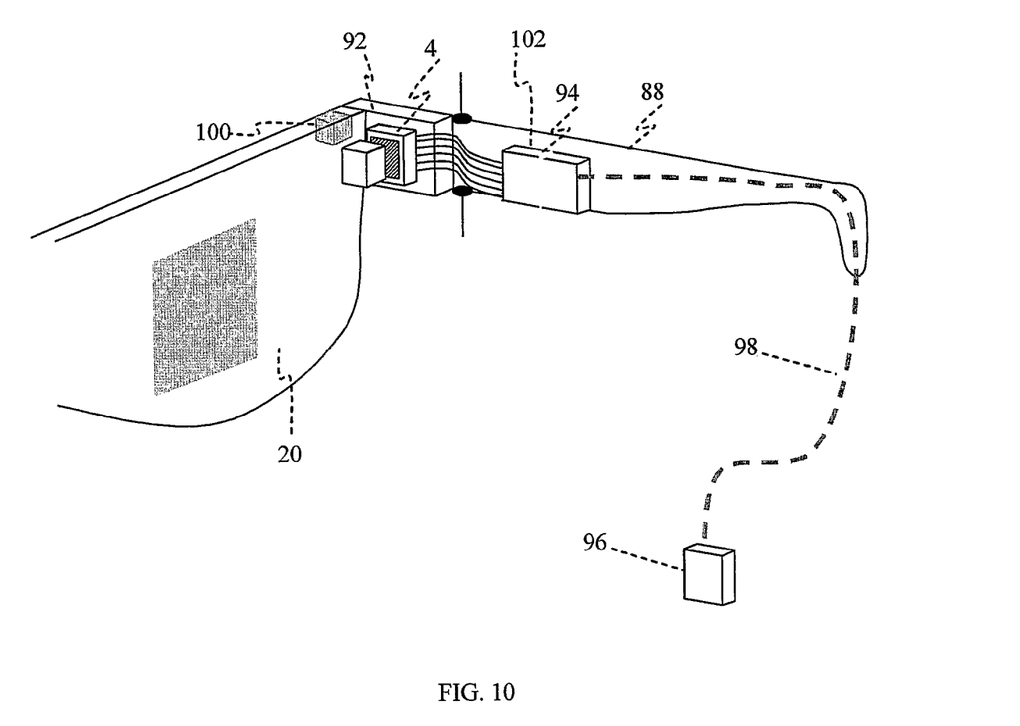
FIG. 10 illustrates an exemplary embodiment of an LOE embedded in standard eyeglass frames wherein an image-capturing device is attached to the eyeglass frames.

FIG. 10 illustrates a modified version of the embodiment described in FIG. 9. In addition to the components which are embedded in the eyeglass frames, a miniature video camera 100 with, or affixed to, optional optical zoom capability is installed in e.g., the front region of the frame 92. The camera captures images from the external scene, transfers the video signal to an image-processing unit 102, which can be installed inside the electronics unit 94 and which can be controlled in real-time by the user. The processed image signal is then transferred to the image source 4 which projects the image through the LOE 20 into the eye of the user.

The embodiment of FIG. 10 can be implemented in a wide variety of applications. A possible utilization is for users who require an ability to perform close-up views on distant objects. The user can set the zoom position of the video camera according to the desired magnification. The captured image can then be processed by the image-processing unit and projected by the optical system. The image-capturing device 100 does not necessarily have to be a simple video camera. Another application can combine a thermal camera or a miniature star-light-amplifier (SLA) to materialize a night-vision goggle device. The image from the external scene can be recorded, even in bad lighting conditions or even in complete darkness, and translated by the processing unit 102 to a conventional video image, which can be seen easily by the user. The optical axes of the image capturing device and the imaging system could be mutually aligned, along with a unity magnification. Therefore, the projected image could be combined together with the real external scene to yield an optimal hybrid image. While using a thermal camera as the image-capturing device, it would be advantageous to use a camera, which utilizes an uncooled detector. This can yield a low-cost and very compact system.

Another potential application of the embodiment illustrated in FIG. 10 is a visual aid for people who suffer from age-related macular degeneration (AMD). AMD is a progressive eye condition affecting many millions people around the world. The disease attacks the macula of the eye, where the sharpest central vision occurs. Although it rarely results in complete blindness, it destroys the clear, "straight ahead" central vision necessary for reading, driving, identifying faces, watching television, doing fine detailed work, safely navigating stairs and performing other daily tasks that are usually taken for granted, leaving only dim images or black holes at the center of vision. It can also dim contrast sensitivity and color perception. Peripheral vision may not be affected, and it is possible to see "out of the corner of the eye".

Presently, there are some products in the market to assist with low vision. One of the more popular devices is the spectacle-mounted magnifiers which exploit the undamaged peripheral vision of the patient to enable him to function as normally as possible. Spectacle-mounted telescopes for distance, or spectacle-mounted microscopes for close-up, can significantly improve visual capabilities. These devices protrude from the spectacle frame, and can be used with one or both eyes and they can magnify between 2 to 10 times, depending on the size of the telescope. Unfortunately, as the desired magnification of the system increases, these devices become larger, heavier and bulkier, and therefore, even for moderate performance, impractical. This is a major drawback for all kinds of displays but especially in head-mounted applications and even more so for elderly users, wherein the system must necessarily be as light and as compact as possible. Another disadvantage is the "unsocial appearance" of the device, resulting from its strange shape and large dimensions. In addition, the functionality with this device can sometimes be very complicated. For instance, when using spectacle-mounted microscopes, objects must be held much closer to the eyes than normal. Since the embodiment described in FIG. 10 can be as compact and light as conventional spectacles, with the same "natural look", this device can be a good candidate for use as an effective user-friendly low vision aid for people who suffer from AMD. The user can control the zoom of the optical system to achieve the required optical magnification easily, in accordance with his medical conditions and with the external scene. Moreover, this type of spectacles reflects the functionality of bifocals in that they allow a person to switch to the required zoom operation for improved distance vision, and back to the conventional spectacle lens for general orientation, with the additional advantage that this zoom is dynamic and continuous.

There are some alternatives as to the precise way in which an LOE can utilized the embodiments illustrated in FIGS. 9 and 10. The simplest option is to use a single element for one eye. Another option is to use an element and a display source for each eye, projecting the same image, wherein the preferred place for the display sources is next to the temples. A similar option is to project the same image for both eyes but utilizing only one display source which is located between the two glasses, whereby its output is split between the two LOEs. Alternatively, it is possible to project two different parts of the same image, with some overlap between the two eyes, enabling a wider FOV. Yet another possibility is to project two different scenes, one to each eye, in order to create a stereoscopic image. With this alternative, attractive implementations are possible, including 3-dimensional movies, advanced virtual reality, training systems and others. With all the different alternatives described above for utilizing an LOE inside eyeglass frames, there are also a few alternative methods for using the image-capturing device. The simplest method is to use a single device and to split its image into the two display sources according to the exact configuration of the system. Even when using a single camera, it is possible to create, with the image-processing unit, two different images that can be transferred to the display sources to create a stereoscopic image. There are applications, however, wherein at least two different image-capturing devices are required to create the desired image.

The embodiments of FIGS. 9 and 10 are just examples illustrating the simple implementation of the present invention. Since the LOE, constituting the core of the system, is very compact and lightweight, it could be installed in a vast variety of arrangements. Hence, many other embodiments are also possible, including a visor, a folding display, a monocle, and many more. This embodiment is designated for applications where the display should be near-to-eye, head-mounted, head-worn or head-carried. There are, however, applications where the display is located differently. An example of such an application is a hand-held device for mobile application, such as a cellular phone. These devices are expected to perform novel operations in the near future, which require the resolution of a large screen, including videophone, internet connection, access to electronic mail, and even the transmission of high-quality television satellite broadcasting. With the existing technologies, a small display could be embedded inside the phone, however, at present, such a display can project either video data of poor quality only, or a few lines of Internet or e-mail data directly into the eye.

Figure 11:
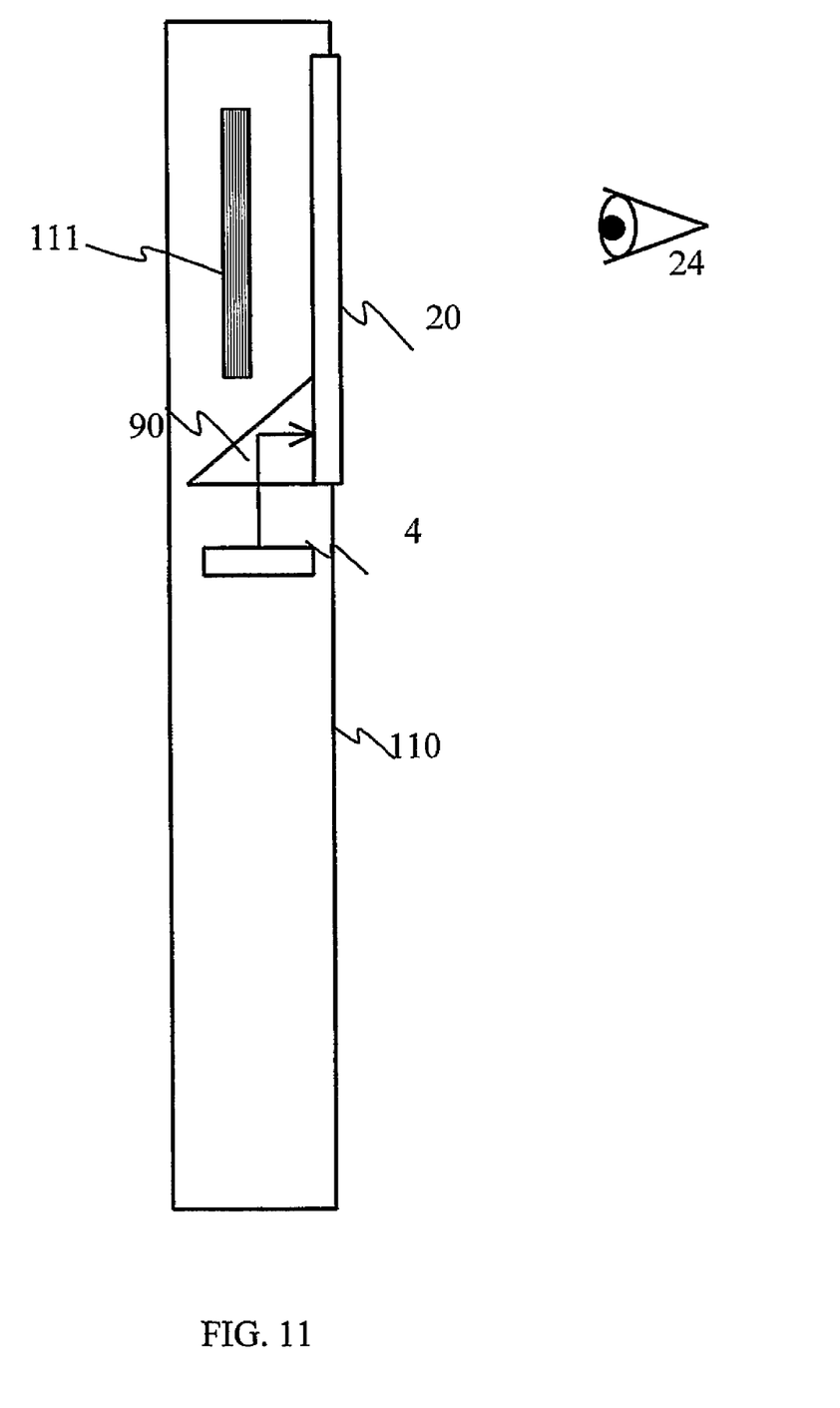
FIG. 11 illustrates an exemplary embodiment of an LOE embedded in a hand carried display system.

FIG. 11 illustrates an alternative embodiment, based on the present invention, which eliminates the current necessary compromise between the small size of mobile devices and the desire to view digital content on a full format display. This application is a hand-held display (HHD), which resolves the previously opposing requirements of achieving small mobile devices, and the desire to view digital content on a full format display, by projecting high quality images directly into the eye of the user. An optical module including the display source 4, the collimating and folding element 90 and the substrate 20 is integrated into the body of a cellular phone 110, where the substrate 20 replaces the existing protective cover-window of the phone. Specifically, the volume of the support components, including source 4 and collimating and folding element 90, is sufficiently small to fit inside the acceptable volume for modern cellular devices. In order to view the full screen, transmitted by the device, the user positions the window in front of his eye 24, observing the image with high FOV, a large eye-motion-box and a comfortable eye-relief. It is also possible to view the entire FOV at a larger eye-relief by tilting the device to display different portions of the image. Furthermore, since the optical module can operate in see-through configuration, a dual operation of the device is possible; namely there is an option to maintain the conventional cellular display 111 intact. In this manner, the standard, low-resolution display can be viewed through the LOE 20 when the display source 4 is shut-off. In a second, virtualmode, designated for e-mail reading, internet surfing, or video operation, the conventional display 111 is shut-off, while the display source 4 projects the required wide FOV image into the eye of the viewer through the LOE 20. The embodiment described in FIG. 11 is only an example, illustrating that applications other than head-mounted displays can be materialized. Other possible hand-carried arrangements include palm computers, compact entertainment devices like the IPod, small displays embedded into wristwatches, a pocket-carried display having the size and weight reminiscent of a credit card, and many more. Alternatively, instead of integrating the LOE inside the HHD as illustrated in FIG. 11 it is clearly possible to fabricate a separate viewing device, as illustrated in FIGS. 9 and 10 and connecting it into a conventional HHD.

Figure 12:
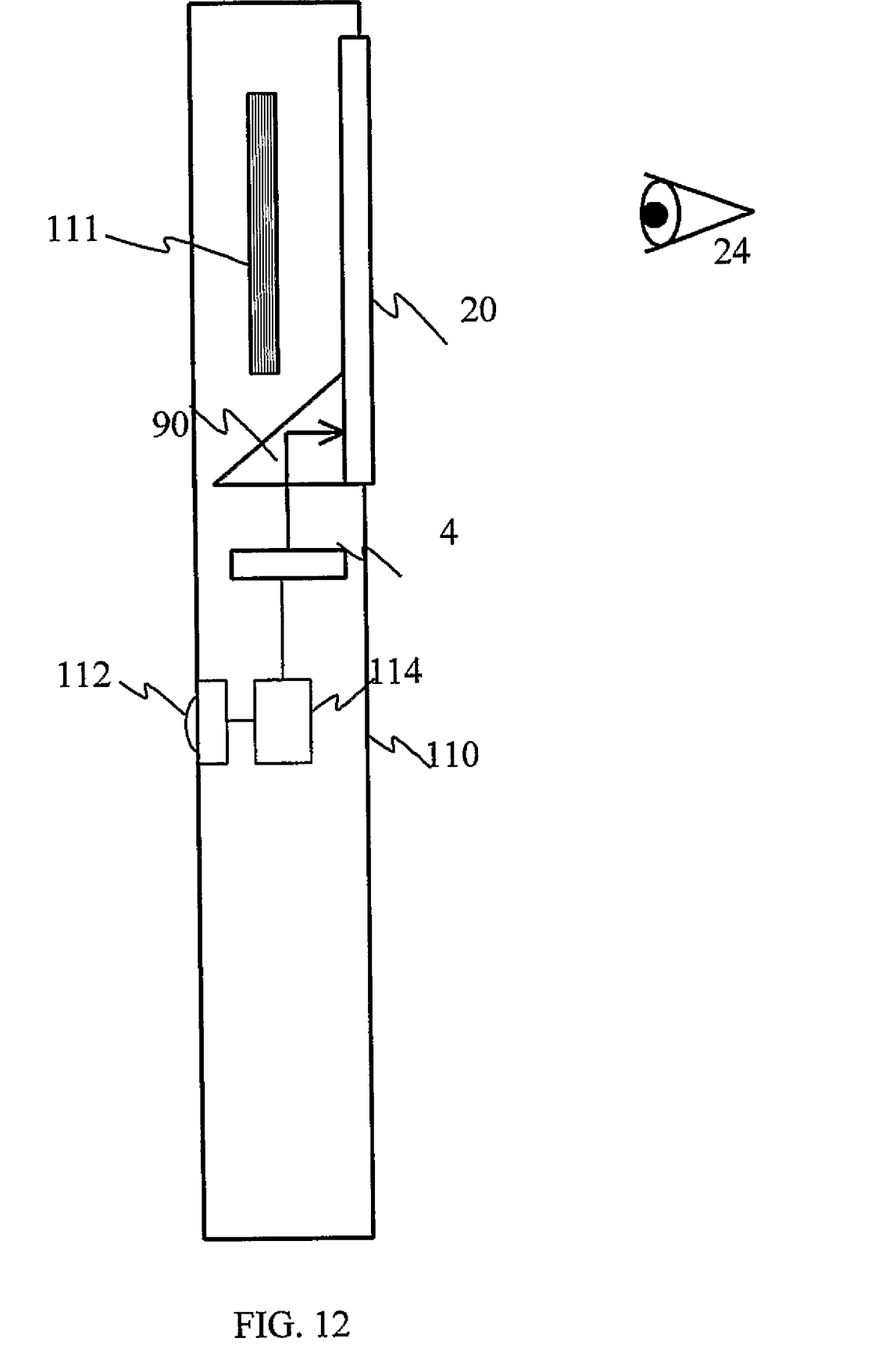
FIG. 12 illustrates an exemplary embodiment of an LOE embedded in a hand carried display system wherein an image capturing device is attached to the mechanical body of the hand carried display system.

Similarly to the description above with reference to FIGS. 9 and 10, FIG. 12 illustrates a modified version of the embodiment described in FIG. 11. In addition to the components which are embedded in the hand-held device, a miniature image capturing device 112 with optional optical zoom capability is installed in the front region of the body 110. The camera captures images from the external scene and transfers the video signal to an image-processing unit 114, which can be installed inside the electronic unit of the hand-held display and which can be controlled in real-time by the user. The processed image signal is then transferred to the image display source 4, which projects the image through the LOE 20 into the eye of the user.

There are many applications utilizing the embodiment illustrated in FIG. 12. The most common one is a digital-video (DV) camera, either that which is installed inside a cellular phone or a DV camera per-se. For most of the conventional DV cameras, the display device, which enables the user to see the recorded scene during the operation, is either an eyepiece or a miniature TV screen. In both cases, the resolution and the quality of the projected image are much lower than the recorded image. As a result, the recorded image is not as was envisioned during the recording process in many cases. Much better results could be achieved if the user would have a higher resolution image which would be projected utilizing the LOE-based optical system illustrated in FIG. 12. Another possible application is a high-resolution surveillance system. Here, a high-resolution zoom video camera can capture a distant image and project it into the eyes of the viewer as a fine-details wide virtual image. By utilizing a thermal camera or a miniature SLA as the image capturing device 114, it is possible to materialize a high resolution surveillance system also in bad lighting conditions, and even in complete darkness.

The embodiments described above are mono-ocular optical systems, that is, the image is projected onto a single eye. There are, however, applications, such as head-up displays (HUD), wherein it is desired to project an image onto both eyes. Until recently, HUD systems have been used mainly in advanced combat and civilian aircraft. There have been numerous proposals and designs, of late, to install a HUD in front of a car driver in order to assist in driving navigation or to project a thermal image into his eyes during low-visibility conditions. Current aerospace HUD systems are very expensive, the price of a single unit being of the order of hundreds of thousands of dollars. In addition, the existing systems are very large, heavy, and bulky, and are too cumbersome for installation in a small aircraft let alone a car. LOE-based HUDs potentially provide the realization of a very compact, self-contained HUD, that can be readily installed into confined spaces. It also simplifies the construction and manufacturing of the optical systems related to the HUD and as such, could be suitable for improving on aerospace HUDs, as well as introducing a compact, inexpensive, consumer version for the automotive industry.

Figure 13:
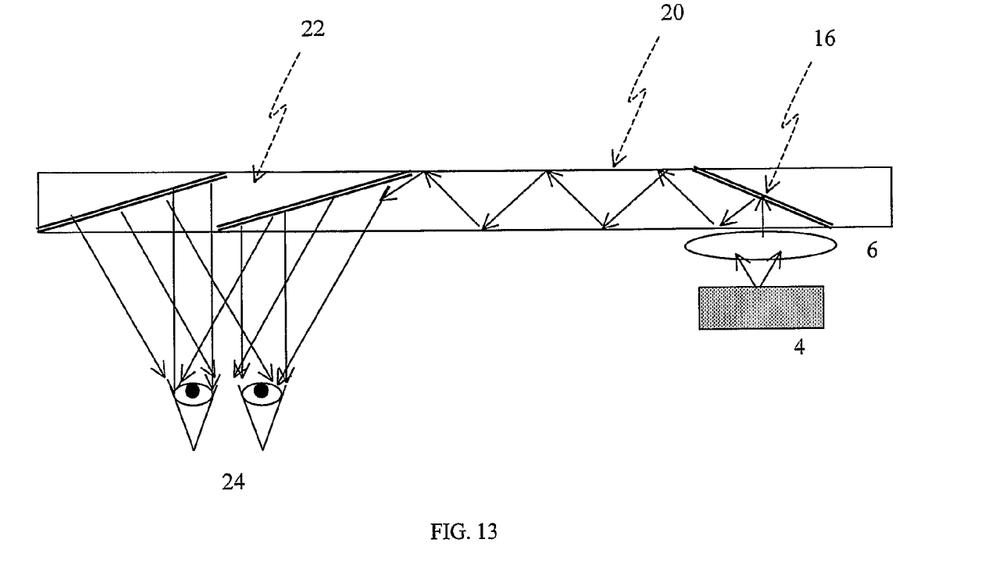
FIG. 13 illustrates an exemplary HUD system.

FIG. 13 illustrates a method of materializing an HUD system based on the present invention. The light from a display source 4 is collimated by a lens 6 to infinity and coupled by the first reflecting surface 16 into substrate 20. After reflection at a second reflecting array (not shown), the optical waves impinge on a third set of reflecting surfaces 22, which couple the light out into the eyes 24 of the viewer. The overall system can be very compact and lightweight, of the size of a large postcard having a thickness of a few millimeters. The display source, having a volume of a few cubic centimeters, can be attached to one of the corners of the substrate, where an electrical cord can transmit the power and data to the system. It is expected that the installation of the presented HUD system will be no more complicated than the installation of a simple commercial audio system. Moreover, since there is no need for an external display source for image projection, the necessity to install components in unsafe places is avoided.

Figure 14:
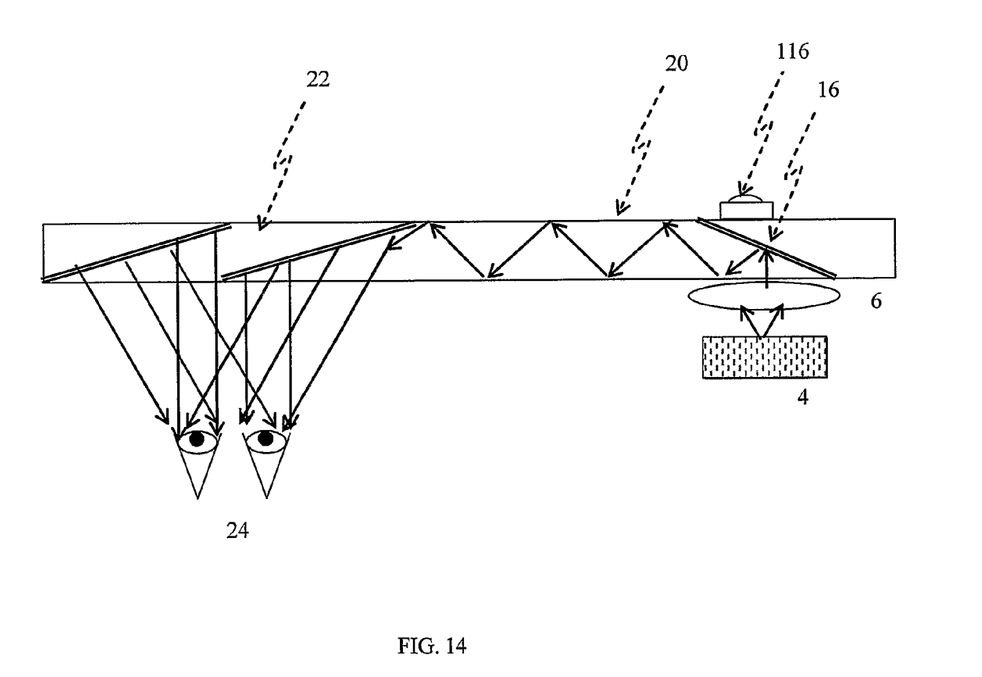
FIG. 14 illustrates an exemplary HUD system, in accordance with the present invention, wherein an image-capturing device is attached to the mechanical body of the HUD system.

Similarly to that described above in reference to FIGS. 10 and 12, FIG. 14 illustrates a modified version of the embodiment described in FIG. 13. In addition to the components which are embedded in the HUD system, a miniature image capturing device 116, with optional optical zoom capability, is installed in the front region of the body of the HUD system, and is connected via an image processing unit (not shown) to the display source 4. There are several applications which can be implemented utilizing the embodiment illustrated in FIG. 14. In the aerial HUD application, the image-capturing device could be aligned with another external sensor such as the aerial RADAR, a tracking mechanism of an air missile or a navigation system. Here the detected target could be captured by the image-capturing device, transferred through the image-processing unit into the display source, and a fine-detailed image of the target could be projected into the eyes of the pilot. This system may be utilized as an enhanced friend-foe-identification (FFI) device for military aircrafts or as an air-traffic warning system for civilian aircrafts. As before, the image-capturing device could be a digital video camera for day-light conditions, or a thermal camera, an SLA system or a millimeter-wave detection system, for low-vision conditions.

Another possible application is an enhanced-vision system (EVS) for landing during bad lighting conditions. Here the image-capturing device can be a thermal camera, a millimeter-wave detection device, a video camera operating in the near-IR region to detect the runway lamps, or any combination of the above detectors. The captured image of the runway area could be projected into the eyes of the pilot and could assist him during the landing procedure.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical system, comprising:
   a mechanical body;
   a light-transmitting substrate having at least two major surfaces and edges, embedded in the mechanical body, the light-transmitting substrate having a plurality of partially reflecting surfaces parallel to each other and not parallel to any of the edges of the substrate;

an optical means for coupling light into the substrate by total internal reflection;

at least one display source;

at least one image processing unit connected to the display source; and at least one image capturing device connected to the image processing unit;

the image capturing device, the display source, and the image processing unit being attached to the mechanical body.

2. The optical system according to claim 1, wherein said display source produces image light waves which are coupled by said optical means into said substrate by total internal reflection.

3. The optical system according to claim 1, wherein said plurality of partially reflecting surfaces couples the light waves trapped by total internal reflection out of said substrate.

4. The optical system according to claim 1, wherein said substrate is partially transparent.

5. The optical system according to claim 1, further comprising an opaque layer attached to the surface of said substrate, for blocking the entrance of light waves from the external scene.

6. The optical system according to claim 1, further comprising a variable. transmittance layer attached to the surface of said substrate, for controlling the brightness of light waves passing through said device from the external scene.

7. The optical system according to claim 6, wherein the transmittance of said variable transmittance layer is determined automatically according to the brightness of the external scene.

8. The optical system according to claim 1, wherein said mechanical body is a spectacle frame.

9. The optical system according to claim 8, wherein at least two different light-transmitting substrates are embedded inside said spectacle frame.

10. The optical system according to claim 9, wherein a single display source is attached to said spectacle frame and wherein the image from said display sources is split into said two light-transmitting substrates.

11. The optical system according to claim 9, wherein two different display sources are attached to said spectacle frame.

12. The optical system according to claim 11, wherein two different images are projected from said two different display sources.

13. The optical system according to claim 12, wherein said two different display sources project two different parts of the same image, with some overlap between the two parts.

14. The optical system according to claim 12, wherein said two different display sources project two different scenes in order to create a stereoscopic image.

15. The optical system according to claim 8, wherein said device functions as low-vision aid.

16. The optical system according to claim 8, wherein said system functions as a surveillance system.

17. The optical system according to claim 1, further comprising an external sensor unit which is aligned with said image capturing device.

18. The optical system according to claim 17, wherein said external sensor unit is a RADAR system.

19. The optical system according to claim 17, wherein said external sensor unit is a tracking mechanism of a missile.

20. The optical system according to claim 17, wherein said external sensor unit is a navigation system.

21. The optical system according to claim 1, wherein said system functions as a friend-foe-identification system.

22. The optical system according to claim 1, wherein said system functions as a safety warning system.

23. The optical system according to claim 1, wherein said system functions as an enhanced vision system.

24. The optical device according to claim 1, wherein at least one of said partially reflecting surfaces is coated with thin-film, angular-sensitive material.

* * * * *